(12) United States Patent
Weller et al.

(10) Patent No.: US 8,673,466 B2
(45) Date of Patent: Mar. 18, 2014

(54) COPTCR-BASED BIT PATTERNED MAGNETIC MEDIA

(75) Inventors: Dieter K. Weller, San Jose, CA (US);
Hans J. Richter, Palo Alto, CA (US);
Samuel D. Harkness, IV, Berkeley, CA (US); Erol Girt, Berkeley, CA (US)

(73) Assignee: Seagate Technology LLC, Cupertino, CA (US)

( * ) Notice: Subject to any disclaimer, the term of this patent is extended or adjusted under 35 U.S.C. 154(b) by 1465 days.

(21) Appl. No.: 11/525,958

(22) Filed: Sep. 25, 2006

(65) Prior Publication Data
US 2008/0075978 A1     Mar. 27, 2008

(51) Int. Cl.
*G11B 5/66* (2006.01)

(52) U.S. Cl.
USPC .................................................. 428/836.1

(58) Field of Classification Search
USPC ............................................. 428/800–848.9
See application file for complete search history.

(56) References Cited

U.S. PATENT DOCUMENTS

| | | | |
|---|---|---|---|
| 5,820,769 A | 10/1998 | Chou | |
| 5,900,324 A * | 5/1999 | Moroishi et al. | 428/611 |
| 6,331,364 B1 | 12/2001 | Baglin et al. | |
| 6,383,597 B1 | 5/2002 | Fullerton et al. | |
| 6,383,598 B1 | 5/2002 | Fullerton et al. | |
| 6,391,430 B1 | 5/2002 | Fullerton et al. | |
| 6,865,044 B1 | 3/2005 | Albrecht et al. | |
| 2003/0091798 A1 * | 5/2003 | Zheng et al. | 428/195 |
| 2004/0053073 A1 * | 3/2004 | Lu et al. | 428/694 T |
| 2004/0157033 A1 * | 8/2004 | Okawa et al. | 428/65.3 |
| 2004/0185307 A1 * | 9/2004 | Oikawa et al. | 428/694 TP |
| 2005/0058854 A1 * | 3/2005 | Takekuma et al. | 428/694 TM |
| 2006/0003190 A1 * | 1/2006 | Abarra et al. | 428/832.1 |
| 2006/0040140 A1 * | 2/2006 | Kaizu et al. | 428/829 |

OTHER PUBLICATIONS

Dieter Weller et al. "Thermal Effects Limits in Ultrahigh-Density Magnetic Recording" IEE Transations on Magnetics, vol. 35, No. 6, Nov. 1999.
D Weller et al. "Advanced Magnetic Nanostructures" CH. 11, Media for Extremely High Density Recording, CAISS, Santa Clara, Feb. 22, 2006.
BD Terris. "Nanofabricated and Self-Assembled Magnetic Structures as Data Storage Media" Hitachi Global Storage Technologies, San Jose Research Center, 650 Harry Road, San Jose CA 95120 USA.

* cited by examiner

*Primary Examiner* — Holly Rickman
*Assistant Examiner* — Linda Chau

(57) ABSTRACT

A bit patterned magnetic recording medium comprises a substrate having a surface, and a plurality of spaced apart magnetic elements on the surface, each element constituting a discrete magnetic domain or bit of the same structure and comprised of a stack of thin film layers including in order from the substrate surface: a seed layer; and a perpendicular magnetic recording layer in contact with a surface of the seed layer and comprising a $Co_{1-x-y}Pt_xCr_y$ alloy material, where $0.05 \leq x \leq 0.35$ and $0 \leq y \leq 0.15$. The $Co_{1-x-y}Pt_xCr_y$ alloy material has a first order magnetic anisotropy constant $K_1$ up to about $2 \times 10^7$ erg/cm$^3$, a saturation magnetization $M_s$ up to about 1200 emu/cm$^3$, an anisotropy field $H_K = 2K_1/M_s$ up to about 35 kOe, a hexagonal (0001) crystal structure with c-axis perpendicular to a surface thereof, and an X-Ray diffraction (XRD) rocking curve with a full width at half maximum (FWHM) of ~5° or less.

27 Claims, 1 Drawing Sheet

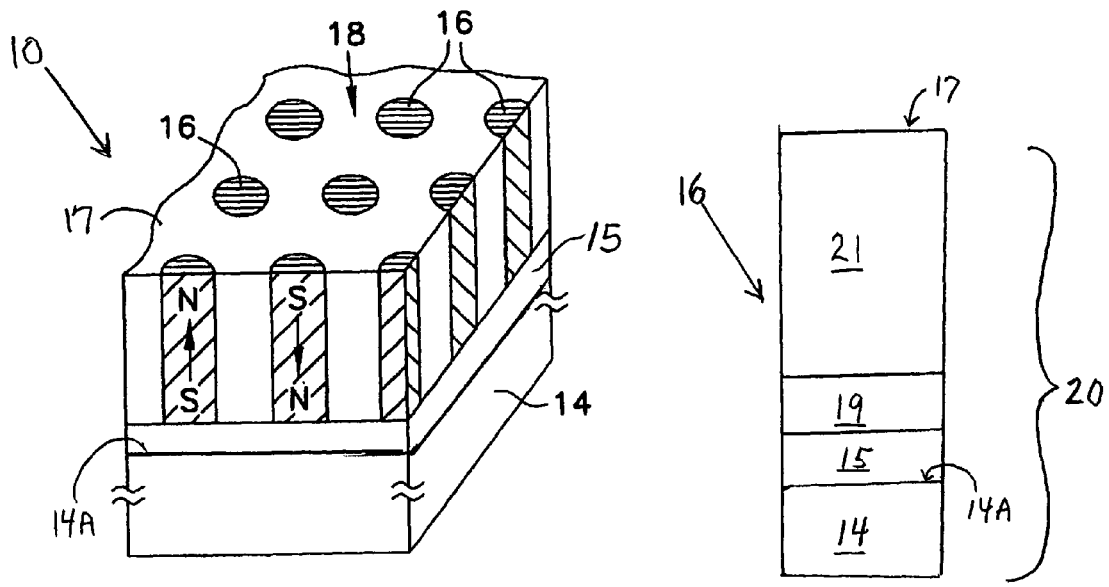
FIG. 1
FIG. 2
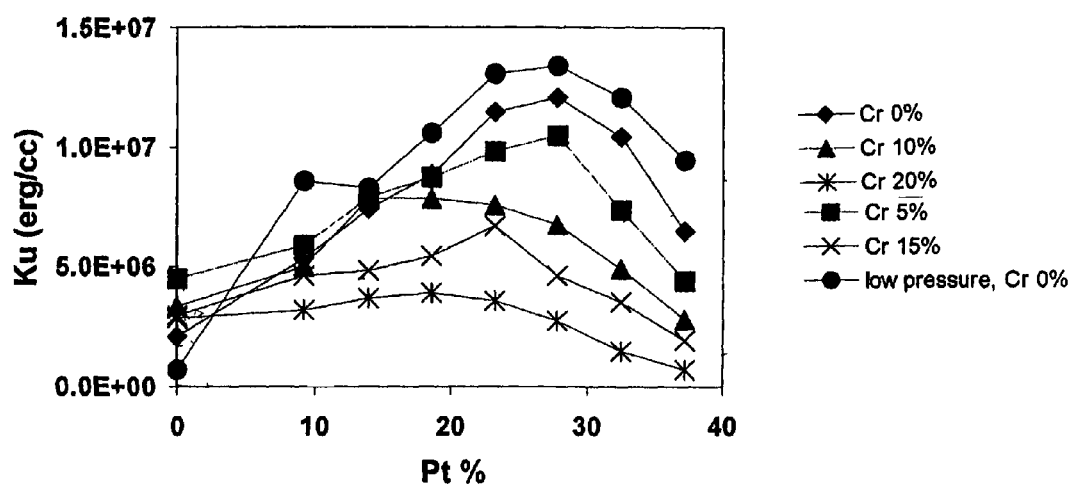
FIG. 3

COPTCR-BASED BIT PATTERNED MAGNETIC MEDIA

FIELD OF THE INVENTION

The present invention relates to improved bit-patterned magnetic media ("BPM") with magnetic layer/underlayer structure providing ultra-high areal recording density, and to methods of fabricating same. The invention has particular utility in the manufacture and use of high areal recording density magnetic media, e.g., in hard disk form, suitable for use in computer-related applications.

BACKGROUND OF THE INVENTION

Designers, manufacturers, and users of electronic computers and computing systems require reliable and efficient equipment for storage and retrieval of information in digital form. Conventional storage systems, such as magnetic disk drives, are typically utilized for this purpose and are well known in the art. However, the amount of information that is digitally stored continually increases, and designers and manufacturers of magnetic recording media work to increase the storage capacity of magnetic disks.

In conventional magnetic disk data/information storage, the data/information is stored in a continuous magnetic thin film overlying a substantially rigid, non-magnetic disk. Each bit of data/information is stored by magnetizing a small area of the thin magnetic film using a magnetic transducer (write head) that provides a sufficiently strong magnetic field to effect a selected alignment of the small area (magnetic grain) of the film. The magnetic moment, area, and location of the small area comprise a bit of binary information which must be precisely defined in order to allow a magnetic read head to retrieve the stored data/information.

Such conventional magnetic disk storage media incur drawbacks and disadvantages which adversely affect realization of high areal density data/information storage, as follows:

(1) the boundaries between adjacent pairs of bits tend to be ragged in continuous magnetic films, resulting in noise generation during reading; and (2) the requirement for increased areal recording density has necessitated a corresponding decrease in recording bit size or area. Consequently, grain sizes of continuous film media have become extremely minute, e.g., on the order of nanometers (nm). In order to obtain a sufficient output signal from such minute bits, the saturation magnetization ($M_s$) and thickness of the film must be as large as possible. However, the magnetization of such minute bits is extremely small, resulting in a loss of stored information due to magnetization reversal by "thermal fluctuation", also known as the "superparamagnetic effect".

Regarding item (2), it is further noted that for longitudinal type continuous magnetic media, wherein the magnetic easy axis is oriented parallel to the film plane (i.e., surface), magnetization reversal by the superparamagnetic effect may occur even with relatively large magnetic particles or grains, thereby limiting future increases in areal recording density to levels necessitated by current and projected computer-related applications. On the other hand, for perpendicular type continuous magnetic media, wherein the magnetic easy axis is oriented perpendicular to the film plane (i.e., surface), growth of the magnetic particles or grains in the film thickness direction increases the volume of magnetization of the particles or grains while maintaining a small cross-sectional area (as measured in the film plane). As a consequence, onset of the superparamagnetic effect can be suppressed for very small particles or grains of minute width. However, further decrease in grain width in perpendicular media necessitated by increasing requirements for areal recording density will inevitably result in onset of the superparamagnetic effect even for such type media.

The superparamagnetic effect is a major limiting factor in increasing the areal recording density of continuous film magnetic recording media. Superparamagnetism results from thermal excitations which perturb the magnetization of grains in a ferromagnetic material, resulting in unstable magnetization. As the grain size of magnetic media is reduced to achieve higher areal recording density, the superparamagnetic instabilities become more problematic. The superparamagnetic effect is most evident when the grain volume V is sufficiently small such that the inequality $KV/k_BT>40$ cannot be maintained, where K is the magnetic crystalline anisotropy energy density of the material, $k_B$ is Boltzmann's constant, and T is the absolute temperature. When this inequality is not satisfied, thermal energy demagnetizes the individual magnetic grains and the stored data bits are no longer stable. Consequently, as the magnetic grain size is decreased in order to increase the areal recording density, a threshold is reached for a given K and temperature T such that stable data storage is no longer possible.

So-called "patterned" or "bit patterned" magnetic media ("BPM") have been proposed as a means for overcoming the above-described problem of conventional continuous magnetic media associated with magnetization reversal via the superparamagnetic effect, e.g., as disclosed in U.S. Pat. No. 5,956,216, the entire disclosure of which is incorporated herein by reference. The term "patterned" media generally refers to magnetic data/information storage and retrieval media wherein a plurality of discrete, independent regions of magnetic material form discrete, independent magnetic elements which function as recording bits are formed on a non-magnetic substrate. Since the regions of ferromagnetic material comprising the magnetic bits or elements are independent of each other, mutual interference between neighboring bits can be minimized. As a consequence, patterned magnetic media are advantageous vis-à-vis continuous magnetic media in reducing recording losses and noises arising from neighboring magnetic bits.

Generally, each magnetic bit or element has the same size and shape, and is composed of the same magnetic material as the other elements. The elements are arranged in a regular pattern over the substrate surface, with each element having a small size and desired magnetic anisotropy, so that, in the absence of an externally applied magnetic field, the magnetic moments of each discrete magnetic element will aligned along the same magnetic easy axis. Stated differently, the magnetic moment of each discrete magnetic element has only two states: the same in magnitude but aligned in opposite directions. Each discrete magnetic element forms a single magnetic domain or bit and the size, area, and location of each domain is determined during the fabrication process.

During writing operation of patterned media, the direction of the magnetic moment of the single magnetic domain element or bit is flipped along the easy axis, and during reading operation, the direction of the magnetic moment of the single magnetic domain element or bit is sensed. While the direction of the magnetic easy axis of each of the magnetic domains, elements, or bits can be parallel or perpendicular to the surface of the domain, element, or bit, corresponding to conventional continuous longitudinal and perpendicular media, respectively, patterned media comprised of domains, elements, or bits with perpendicularly oriented magnetic easy axis are advantageous in achieving higher areal recording densities for the reasons given above.

Patterned media in disk form offer a number of advantages relative to conventional disk media. Specifically, the writing process is changed, requiring synchronization of the head to the media; this results in much lower noise and lower error rate, thereby allowing much higher areal recording density. In patterned disk media, the writing process does not define the location, shape, and magnetization value of a bit, but merely flips the magnetization orientation of a patterned single domain magnetic structure. Writing of data can be essentially perfect, even when the transducer head deviates slightly from the intended bit location and partially overlaps neighboring bits, as long as only the magnetization direction of the intended bit is flipped. By contrast, in conventional magnetic disk media, the writing process must define the location, shape, and magnetization of a bit. Therefore, with such conventional disk media, if the transducer head deviates from the intended location, the head will write to part of the intended bit and to part of the neighboring bits. Another advantage of patterned media is that crosstalk between neighboring bits is reduced relative to conventional media, whereby areal recording density is increased. Each individual magnetic element, domain, or bit of a patterned medium can be tracked individually, and reading is less jittery than in conventional disks.

Notwithstanding the substantial increase in recording/data storage performance capability afforded by bit patterned media (BPM) vis-à-vis conventional continuous film-based media, the escalating requirements for even higher areal recording densities necessitate further development of reliable, high magnetic performance BPM with optimal magnetic materials and layer structures. Consequently, there exists a clear need for improved bit patterned media with higher areal recording densities than are presently available, and which include magnetic layer structures which provide optimal bit patterned media function in terms of magnetic performance characteristics, stability, and ease of fabrication.

DISCLOSURE OF THE INVENTION

An advantage of the present invention is improved bit patterned magnetic recording media.

Another advantage of the present invention is improved bit patterned media with improved magnetic recording characteristics and capable of bit densities in the range from about 250 Gbit/in$^2$ to about 10 Tbit/in$^2$.

Still another advantage of the present invention is an improved method of fabricating bit patterned media with improved magnetic recording characteristics and capable of bit densities in the range from about 250 Gbit/in$^2$ to about 10 Tbit/in$^2$.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by an improved bit patterned magnetic recording medium, comprising:

(a) a substrate having a surface; and
(b) a plurality of spaced apart magnetic elements on the surface, each of the elements constituting a discrete magnetic domain or bit of the same structure and comprised of a stack of thin film layers, said stack including, in order from the substrate surface:

(i) a seed layer; and
(ii) a perpendicular magnetic recording layer in contact with a surface of the seed layer and comprising a $Co_{1-x-y}Pt_xCr_y$ alloy material, where $0.05 \leq x \leq 0.35$ and $0 \leq y \leq 0.15$.

According to preferred embodiments of the present invention, the $Co_{1-x-y}Pt_xCr_y$ alloy material has a first order magnetic anisotropy constant $K_1$ up to about $2\times10^7$ erg/cm$^3$, a saturation magnetization $M_s$ up to about 1200 emu/cm$^3$, an anisotropy field $H_K=2K_1/M_s$ up to about 35 kOe, a hexagonal (0001) crystal structure with c-axis perpendicular to a surface thereof and an X-Ray diffraction (XRD) rocking curve with a full width at half maximum (FWHM) of ~5° or less.

In accordance with further preferred embodiments of the present invention, the seed layer is lattice matched to and promotes growth of the perpendicular magnetic recording layer with a hexagonal (0001) crystal structure with c-axis perpendicular to a surface thereof and an XRD rocking curve with full width at half maximum (FWHM) of ~5° or less. Preferably, the seed layer is from about 5 to about 10 nm thick, and is formed of elemental Ru or an alloy thereof, or of Pt or Pd, or an alloy thereof.

Preferred embodiments of the invention include those wherein $0.23 \leq x \leq 0.33$, $y=0$, and the $Co_{1-x-y}Pt_xCr_y$ alloy material is a $Co_{1-x}Pt_x$ alloy material with a high perpendicular magnetic anisotropy K of at least about $1.1\times10^7$ erg/cm$^3$. Further embodiments of the invention include those wherein $x=0.25$ and said $Co_{1-x}Pt_x$ alloy material is $Co_3Pt$, and wherein $0.19 \leq x \leq 0.33$, $0.05 \leq y \leq 0.15$, and the $Co_{1-x-y}Pt_xCr_y$ alloy material has a high perpendicular magnetic anisotropy K of at least about $3\times10^6$ erg/cm$^3$.

Preferably, the perpendicular magnetic recording layer is from about 5 to about 20 nm thick.

According to preferred embodiments of the present invention, the substrate is ferromagnetic and comprises a magnetically soft material, or the substrate is non-magnetic and the layer stack further comprises a layer of magnetically soft material (SUL) between the seed layer and the substrate surface.

According to still further preferred embodiments of the present invention, the layer stack further comprises a protective overcoat layer over the perpendicular magnetic recording layer; the plurality of spaced apart magnetic elements are arranged in a patterned array at a density in the range from about 250 Gbit/in$^2$ to about 10 Tbit/in$^2$; each of the magnetic elements is cylindrically shaped and of equal height, cubic shaped, spherically shaped, or shaped as an elongated parallelepiped; and the medium further comprises:

(c) a non-magnetic material filling spaces between neighboring magnetic elements.

Another aspect of the present invention is an improved method of fabricating a bit patterned magnetic recording medium, comprising steps of:

(a) providing a substrate having a surface; and
(b) forming a plurality of spaced apart magnetic elements on the surface, each of the elements constituting a discrete magnetic domain or bit of the same structure and comprised of a stack of thin film layers, the stack including, in order from the substrate surface:

(i) a seed layer; and
(ii) a perpendicular magnetic recording layer in contact with a surface of the seed layer and comprising a layer of a $Co_{1-x-y}Pt_xCr_y$ alloy material, where $0.05 \leq x \leq 0.35$ and $0 \leq y \leq 0.15$, the layer of $Co_{1-x-y}Pt_xCr_y$ alloy material having a first order magnetic anisotropy constant $K_1$ up to about $2\times10^7$ erg/cm$^3$, a saturation magnetization $M_s$ up to about 1200 emu/cm$^3$, an anisotropy field $H_K=2K_1/M_s$ up to about 35 kOe, a hexagonal (0001) crystal structure with c-axis perpendicular to a surface thereof and an X-Ray diffraction (XRD) rocking curve with a full width at half maximum (FWHM) of ~5° or less.

According to preferred embodiments of the present invention, step (b) comprises forming the seed layer of elemental Ru or an alloy thereof, or Pt or Pd, or an alloy thereof, which seed layer is lattice matched to and promotes growth of the perpendicular magnetic recording layer with a hexagonal (0001) crystal structure with c-axis perpendicular to a surface thereof and an XRD rocking curve with full width at half maximum (FWHM) of ~5° or less.

Further preferred embodiments of the present invention include those wherein step (b) comprises forming a $Co_{1-x-y}Pt_xCr_y$ alloy material wherein $0.23\leq x\leq 0.33$, $y=0$, and the $Co_{1-x}Pt_x$ alloy material has a high perpendicular magnetic anisotropy K of at least about $1.1\times10^7$ erg/cm$^3$; and wherein step (b) comprises forming a $Co_{1-x-y}Pt_xCr_y$ alloy material wherein $0.19\leq x\leq 0.33$, $0.05\leq y\leq 0.15$, and the $Co_{1-x-y}Pt_xCr_y$ alloy material has a high perpendicular magnetic anisotropy K of at least about $3\times10^6$ erg/cm$^3$.

In accordance with still further preferred embodiments of the invention, step (a) comprises providing a ferromagnetic substrate comprised of a magnetically soft material or comprises providing a non-magnetic substrate with a layer of a magnetically soft material (SUL) on a surface thereof and underlying the seed layer formed in step (b); and the method further comprises a step of:

(c) forming a protective overcoat layer over the perpendicular magnetic recording layer.

Still further preferred embodiments of the present invention include those wherein step (b) comprises forming the plurality of spaced apart magnetic elements arranged in a patterned array on the substrate surface at a density in the range from about 250 Gbit/in$^2$ to about 10 Tbit/in$^2$, each of the magnetic elements being cylindrically shaped and of equal height, cubic shaped, spherically shaped, or shaped as an elongated parallelepiped.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the features are not necessarily drawn to scale but rather are drawn as to best illustrate the pertinent features and the same reference numerals are employed throughout for designating similar features, wherein:

FIG. 1 is a simplified, schematic perspective view of a portion of a bit patterned magnetic recording medium according to an illustrative, but non-limitative, embodiment of the present invention;

FIG. 2 is a simplified, schematic cross-sectional view of a bit or element according to an illustrative, but non-limitative, embodiment of the present invention; and FIG. 3 is a graph for illustrating variation of magnetic anisotropy of $Co_{1-x-y}Pt_xCr_y$ alloy materials according to the invention as a function of Pt content.

DESCRIPTION OF THE INVENTION

The present invention has been made with the aim of providing further improvements in bit patterned magnetic recording media for satisfying the continuously escalating requirements for even higher areal recording densities (e.g., on the order of Tbit/in$^2$) in computer-related data/information storage and retrieval applications. As indicated supra, there exists a clear need for improved bit patterned media with higher areal recording densities than are presently available, and which include magnetic recording layer materials and structures which provide optimal bit patterned media function in terms of magnetic performance characteristics, stability, and ease of fabrication.

As indicated above, in bit patterned magnetic recording media ("BPM"), the continuous magnetic recording layer or film of conventional media is replaced with a plurality of discrete elements (or "bits"), each comprising at least one magnetic recording layer. Each discrete magnetic element or bit is separated from neighboring elements or bits by a non-magnetic material, the inter-element spacing being sufficiently large to eliminate or reduce exchange interactions between the elements. Each element or bit is of the same size and shape, comprised of the same layer structure and materials, and arrayed in a regular pattern on the surface of a suitable substrate. Each element or bit is of small physical size, with a preferred shape anisotropy, such that, in the absence of an applied magnetic field, the magnetic moments of each element or bit are aligned along a specific axis of the element or bit. As a consequence, the magnetic moments of each of the elements or bits exist in only two states which are equal in magnitude but aligned in opposite directions. Notwithstanding presence of multiple magnetic grains in each discrete element or bit, each element or bit constitutes a single magnetic domain, the size, area, and location of each element or bit predetermined in the fabrication process. A writing operation of bit patterned media involves "flipping" the direction of the magnetic moment of the single magnetic domain. A reading operation of bit patterned media involves sensing the direction of the magnetic moment of the single magnetic domain. The "easy" axis of the direction of the magnetic moment of the single magnetic domain can be parallel to the surface of the medium, as in "longitudinal" recording, or perpendicular to the surface of the medium, as in "perpendicular" recording. The present invention is primarily directed toward the latter type (i.e., perpendicular) type of recording.

Referring to FIG. 1, shown therein is a simplified, schematic perspective view of a portion of a bit patterned perpendicular magnetic recording medium 10 according to an illustrative, but non-limitative, embodiment of the present invention. As illustrated, medium 10 comprises a substrate 14, a regularly arrayed plurality of cylindrical column-shaped discrete magnetic elements or bits 16 (sometimes referred to as "dots"), each forming a single magnetic domain, a non-magnetic material 18 (e.g., an oxide, such as AlO$_x$, SiO$_x$, WO$_3$, Nb$_2$O$_5$, TiO$_2$, etc., or a nitride, such as SiN$_x$, AlN$_x$, TiN$_x$, etc.) filling the spaces between neighboring elements or bits 16, and a protective overcoat layer (not shown in the figure for illustrative clarity) on the upper surface of the medium. As shown by the vertically directed arrows in the figure, the cylindrical columnar-shaped elements or bits have magnetization easy axis vectors of equal magnitude extending in opposing directions along the long axis of each element or bit, which vectors are perpendicular to surface 17 of medium 10.

While in the illustrated embodiment, the elements or bits 16 are shown as cylindrical column-shaped, bit patterned media such as medium 10 are not limited to the exemplary arrangement shown in FIG. 1 and may comprise elements or bits having a variety of shapes, configurations, areal densities, and array patterns. For example, elements or bits 16 may be being cylindrically shaped and of equal height (as in the illustrated embodiment), cubic shaped, spherically shaped, or in the form of an elongated parallelepiped, and may be arrayed in linear row and column, hexagonal close-packing, etc., patterns. According to the present invention, bit densities may vary widely, and range from about 250 Gbit/in² to about 10 Tbit/in².

Further, in the illustrated embodiment wherein medium 10 is a perpendicular medium comprising discrete magnetic elements or bits 16 in the form of cylindrically shaped columns with magnetization easy axis vectors extending in opposing directions perpendicular to the surface 17 of medium 10, substrate 14 may comprise a magnetically soft material, or the substrate may comprise a non-magnetic material with a layer of magnetically soft material 15 ("SUL") formed on the surface 14A of the substrate over which the magnetic elements or bits 16 are formed. Typical dimensions of cylindrical columnar-shaped magnetic elements or bits 16 with perpendicular magnetic recording layers include lengths from about 5 to about 20 nm and diameters from about 2.5 to about 5 nm.

Adverting to FIG. 2, shown therein is a simplified, schematic cross-sectional view of a bit or element 16 according to an illustrative, but non-limitative, embodiment of the present invention. As illustrated, each cylindrical column-shaped element 16 includes a layer stack 20. The latter includes, in overlying order, a respective portion of substrate 14 comprised of a magnetically soft material (or a non-magnetic material with SUL 15 formed thereon), a seed layer 19, and a magnetically hard perpendicular recording layer 21. A portion of a protective overcoat layer, typically comprising a carbon-based material such as diamond-like carbon ("DLC") overlies the uppermost surface of the medium (which layer is not shown in the figure for illustrative clarity).

The thickness of substrate 14 is not critical; however, in the case of magnetic recording media for use in hard disk applications, substrate 14 must be of a thickness to provide the necessary rigidity. Suitable magnetically soft, low coercivity materials for use as substrate 14 include, but are not limited to: Ni, Co, Fe, a Fe-containing alloy such as NiFe (Permalloy), FeN, FeSiAl, FeSiAlN, FeTaC, a Co-containing alloy such as CoZr, CoZrCr, CoZrTa, CoZrNb, or a Co—Fe-containing alloy such as CoFeZrNb, CoFeZrTa, CoFe, FeCoB, FeCoCrB, and FeCoC. Alternatively, substrate 14 may be formed of a non-magnetic material such as, but not limited to: Al, Al—Mg alloys, other Al-based alloys, NiP-plated Al or Al-based alloys, glass, ceramics, glass-ceramics, polymeric materials, and composites or laminates of these materials, with an about 50 to about 300 nm thick layer of any of the aforementioned magnetically soft materials formed thereon as a SUL 15.

With continued reference to FIG. 2, according to the invention, the seed layer 19 is from about 5 to about 10 nm thick and typically formed of elemental Ru or an alloy thereof (e.g., RuCr), or Pt or Pd, or an alloy thereof. Seed layer 19 is lattice matched to and promotes growth of the perpendicular magnetic recording layer with a hexagonal (0001) crystal structure with c-axis perpendicular to a surface thereof and an X-ray diffraction (XRD) rocking curve with full width at half maximum (FWHM) of ~5° or less.

While a number of materials forming layers with hcp or fcc crystallographic structure may be utilized as the seed layer 19, e.g., CoCr, CoCrRu, CoCrPt, CoCrTa, Cu, etc., Ru is advantageously utilized for seed layer 19 because it forms smooth, continuous, hexagonal films on the abovementioned SUL materials, e.g., FeCoB, when deposited thereon (as by sputtering) in thicknesses of about 10 nm or less. Further, Ru has a good crystal lattice match to Co and CoPt magnetic alloys, and its films are very well-textured, as, e.g., characterized by (XRD) rocking curve with full width at half maximum (FWHM) of ~5° or less. Finally, Ru films advantageously have a (0001) crystal orientation with the c-axis of the hexagonal unit cell directed perpendicular to the film plane. CoPt-based magnetically hard recording layers epitaxially formed thereon (e.g., as by sputtering utilizing a target with alloy composition corresponding to the desired layer composition) assume the orientation of the underlying Ru seed layer with the low FWHM angle described supra, whereby perpendicularly anisotropic magnetically hard recording layers are formed. Alternative materials for use as seed layer 19 include (111) face-centered materials such as Pt, Pd, and alloys thereof.

Overlying and in contact with the surface of seed layer 19 is at least one magnetically hard perpendicular recording layer 21 comprising a $Co_{1-x-y}Pt_xCr_y$ alloy material. According to the present invention, layer 21 is from about 5 to about 20 nm thick and the $Co_{1-x-y}Pt_xCr_y$ alloy material has a first order magnetic anisotropy constant $K_1$ up to about $2 \times 10^7$ erg/cm³, a saturation magnetization $M_s$ up to about 1100 emu/cm³, an anisotropy field $H_K = 2K_1/M_s$ up to about 35 kOe, a hexagonal (0001) crystal structure with c-axis perpendicular to a surface thereof and an X-Ray diffraction (XRD) rocking curve with a full width at half maximum (FWHM) of ~5° or less.

According to the invention, the choice/selection of magnetic parameters, such as K and $M_s$, depends upon the bit density of the media to be fabricated. By way of illustration, but not limitation, for media with lower bit densities on the order of about 250 Gb/in², K and Ms are relatively lower, e.g., $4 \times 10^6$ erg/cm³ and 800-1000 emu/cm³, respectively; whereas, for media with higher bit densities on the order of about 10 Tbit/in², K and $M_s$ are relatively higher, e.g., $1$-$2 \times 10^7$ erg/cm³ and 1000-1200 emu/cm³, respectively.

Referring to FIG. 3, shown therein is a graph illustrating the variation of magnetic anisotropy K of $Co_{1-x-y}Pt_xCr_y$ alloy materials according to the invention as a function of Pt and Cr content, wherein Cr is added to CoPt alloys for increasing corrosion resistance of the films. As may be evident from FIG. 3, addition of Cr degrades the magnetic anisotropy K in proportion to its content, with ~15 at. % Cr considered as an upper practical limit of Cr content. However, the data of FIG. 3 allow for determination of optimal $Co_{1-x-y}Pt_xCr_y$ alloy compositions for obtaining desirably high values of magnetic anisotropy K. Specifically, optimally high values of magnetic anisotropy K for use in perpendicular bit patterned media are obtained when $0.05 \leq x \leq 0.35$ and $0 \leq y \leq 0.15$. Other preferred materials according to the present invention for use in perpendicular bit patterned media include $Co_{1-x-y}Pt_xCr_y$ alloy materials wherein $0.23 \leq x \leq 0.33$, $y=0$, which $Co_{1-x}Pt_x$ (noting y=0) alloys have a high perpendicular magnetic anisotropy K of at least about $1.1 \times 10^7$ erg/cm³; and $Co_{1-x-y}Pt_xCr_y$ alloy materials wherein $0.19 \leq x \leq 0.33$, $0.05 \leq y \leq 0.15$, which $Co_{1-x-y}Pt_xCr_y$ alloys have a high perpendicular magnetic anisotropy K of at least about $3 \times 10^6$ erg/cm³.

According to the invention, each constituent layer of the layer stacks 20 comprising the magnetic elements or bits 16, as well as the protective overcoat layer, may be deposited or otherwise formed by any suitable technique utilized for formation of thin film layers, e.g., any suitable physical vapor deposition ("PVD") technique, including, but not limited to, sputtering, vacuum evaporation, ion plating, cathodic arc deposition ("CAD"), etc., or by any combination of various PVD techniques. A lubricant topcoat layer may be provided over the upper surface of the protective overcoat layer in any convenient manner, e.g., as by dipping the thus-formed medium into a liquid bath containing a solution of the lubricant compound.

Further according to the invention, medium 10 with discrete magnetic elements or bits 16 may be formed in any conventional manner, e.g., as described in U.S. Pat. No. 5,820,769, the entire disclosure of which is incorporated herein by reference. Such methods include initial deposition of a layer stack 20 of desired structure or design, such as in the embodiment illustrated in FIG. 2, which layer stack extends continuously over the surface of substrate 14, followed by patterning according to conventional techniques, including, for example, physical and/or chemical deposition and materials removal methodologies including photolithographic masking, etching, etc., or by photolithographic masking followed by selective deposition of materials comprising the layer stack 20 through apertures formed in the masking layer. In addition, it should again be noted that the present invention is not limited to formation of circular, columnar-shaped discrete magnetic elements 16 arrayed in a hexagonal close packed pattern as in FIG. 1; rather, the invention is broadly applicable to all manner of shapes and array patterns of discrete magnetic elements or bits.

Thus, the present invention advantageously provides improved performance, high areal density, bit patterned magnetic media which media provide a wide range of areal recording densities extending from the Gbit/in$^2$ range to the Tbit/in$^2$ range by virtue of utilization of the improved $Co_{1-x-y}Pt_xCr_y$ alloy materials described herein. The media of the present invention enjoy particular utility in ultra-high recording density systems for computer-related applications. In addition, the inventive media can be fabricated by means of conventional media manufacturing technologies, as indicated above.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A medium, comprising:
a substrate having a surface; and
a plurality of spaced apart magnetic elements on said surface, each of said magnetic elements constituting a discrete magnetic domain of a same structure and comprising a stack of thin film layers, said stack comprising, in order from said substrate surface:
a seed layer; and
a perpendicular magnetic recording layer in contact with a surface of said seed layer and comprising a $Co_{1-x-y}Pt_xCr_y$ alloy material, where $0.05 \leq x < 0.08$ and $0 \leq y < 0.10$.

2. The medium according to claim 1, wherein:
said $Co_{1-x-y}Pt_xCr_y$ alloy material has a first order magnetic anisotropy constant $K_1$ up to about $2 \times 10^7$ erg/cm$^3$, a saturation magnetization $M_s$, up to about 1200 emu/cm$^3$, and an anisotropy field $H_k = 2K_1/M_s$ up to about 35 KOe.

3. The medium according to claim 2, wherein:
said perpendicular magnetic recording layer has a hexagonal (0001) crystal structure with c-axis perpendicular to a surface thereof and an X-Ray diffraction (XRD) rocking curve with a full width at half maximum (FWHM) of ~5° or less.

4. The medium according to claim 1, wherein:
said seed layer is lattice matched to and promotes growth of said perpendicular magnetic recording layer with a hexagonal (0001) crystal structure with c-axis perpendicular to a surface thereof and an XRD rocking curve with full width at half maximum (FWHM) of ~5° or less.

5. The medium according to claim 4, wherein:
said seed layer is from about 5 to about 10 nm thick.

6. The medium according to claim 5 wherein said seed layer is formed of elemental ruthenium (Ru).

7. The medium according to claim 1, wherein:
$0.23 \leq x \leq 0.33$, y=0, and said $Co_{1-x-y}Pt_xCr_y$ alloy material is a $Co_{1-x-y}Pt_x$ alloy material with a high perpendicular magnetic anisotropy K of at least about $1.1 \times 10^7$ erg/cm$^3$.

8. The medium according to claim 7, wherein:
x=0.25 and said $Co_{1-x-y}Pt_x$ alloy material is $Co_3Pt$.

9. The medium according to claim 1, wherein:
said $Co_{1-x-y}Pt_xCr_y$ alloy material has a high perpendicular magnetic anisotropy K of at least about $3 \times 10^6$ erg/cm$^3$.

10. The medium according to claim 1, wherein:
said perpendicular magnetic recording layer is from about 5 to about 20 nm thick.

11. The medium according to claim 1, wherein:
said substrate is ferromagnetic and comprises a magnetically soft material.

12. The medium according to claim 1, wherein:
said layer stack further comprises a protective overcoat layer over said perpendicular magnetic recording layer; and said medium further comprises:
a non-magnetic material filling spaces between neighboring magnetic elements.

13. A method comprising:
accessing a substrate having a surface; and
forming a plurality of spaced apart magnetic elements on said surface, each of said elements constituting a discrete magnetic domain of the same structure and comprised of a stack of thin film layers, said stack including, in order from said substrate surface:
a seed layer; and
a perpendicular magnetic recording layer in contact with a surface of said seed layer and comprising a layer of a $Co_{1-x-y}Pt_xCr_y$ alloy material, where $0.05 \leq x < 0.08$ and $0 \leq y < 0.10$.

14. The method as in claim 13, wherein:
said forming comprises forming said seed layer of elemental Ru which is lattice matched to and promotes growth of said perpendicular magnetic recording layer with a hexagonal (0001) crystal structure with c-axis perpendicular to a surface thereof and an XRD rocking curve with full width at half maximum (FWHM) of ~5° or less.

15. The method as in claim 13, wherein:
said forming comprises forming a $Co_{1-x-y}Pt_xCr_y$ alloy material wherein $0.23 \leq x \leq 0.33$, $y=0$, and said $Co_{1-x-y}Pt_x$ alloy material has a high perpendicular magnetic anisotropy K of at least about $1.1 \times 10^7$ erg/cm$^3$.

16. The method as in claim 13, wherein:
said forming comprises forming a $Co_{1-x-y}Pt_xCr_y$ alloy material wherein said $Co_{1-x-y}Pt_x$ alloy material has a high perpendicular magnetic anisotropy K of at least about $3 \times 10^6$ erg/cm$^3$.

17. The method as in claim 13, wherein:
said accessing comprises accessing a ferromagnetic substrate comprised of a magnetically soft material or comprises providing a nonmagnetic substrate with a layer of a magnetically soft material (SUL) on a surface thereof and underlying said seed layer formed in said forming.

18. The method as in claim 13, further comprising:
forming a protective overcoat layer over said perpendicular magnetic recording layer.

19. The medium according to claim 5 wherein said seed layer is formed of Pt.

20. The medium according to claim 5 wherein said seed layer is formed of an alloy of Pt.

21. The medium according to claim 5 wherein said seed layer is formed of Pd.

22. The medium according to claim 5 wherein said seed layer is formed of an alloy of Pd.

23. The medium according to claim 1 wherein said substrate is non-magnetic and said layer stack further comprises a layer of magnetically soft material (SUL) between said seed layer and said substrate surface.

24. The method as in claim 13, wherein:
said forming comprises forming said seed layer of elemental Pt which is lattice matched to and promotes growth of said perpendicular magnetic recording layer with a hexagonal (0001) crystal structure with c-axis perpendicular to a surface thereof and an XRD rocking curve with full width at half maximum (FWHM) of ~5° or less.

25. The method as in claim 13, wherein:
said forming comprises forming said seed layer of an alloy of Pt which is lattice matched to and promotes growth of said perpendicular magnetic recording layer with a hexagonal (0001) crystal structure with c-axis perpendicular to a surface thereof and an XRD rocking curve with full width at half maximum (FWHM) of ~5° or less.

26. The method as in claim 13, wherein:
said forming comprises forming said seed layer of Pd which is lattice matched to and promotes growth of said perpendicular magnetic recording layer with a hexagonal (0001) crystal structure with c-axis perpendicular to a surface thereof and an XRD rocking curve with full width at half maximum (FWHM) of ~5° or less.

27. The method as in claim 13, wherein:
said forming comprises forming said seed layer of an alloy of Pd which is lattice matched to and promotes growth of said perpendicular magnetic recording layer with a hexagonal (0001) crystal structure with c-axis perpendicular to a surface thereof and an XRD rocking curve with full width at half maximum (FWHM) of ~5° or less.

* * * * *